United States Patent [19]
Udagawa et al.

[11] Patent Number: 5,906,376
[45] Date of Patent: May 25, 1999

[54] METAL GASKET WITH LOCALLY HEATED-TREATING BEAD

[75] Inventors: Tsunekazu Udagawa, Ichikawa; Susumu Inamura, Utsunomiya, both of Japan

[73] Assignee: Ishikawa Gasket Co., Ltd., Tokyo, Japan

[21] Appl. No.: 08/840,607

[22] Filed: Apr. 24, 1997

[51] Int. Cl.⁶ .................................................... F02F 11/00
[52] U.S. Cl. ........................................... 277/595; 277/593
[58] Field of Search .................................. 277/591, 593, 277/594, 595

[56] References Cited

U.S. PATENT DOCUMENTS

| | | | |
|---|---|---|---|
| 4,834,399 | 5/1989 | Udagawa et al. | 277/595 X |
| 5,344,165 | 9/1994 | Miyaoh et al. | 277/595 |
| 5,536,024 | 7/1996 | Udagawa | 277/595 |
| 5,639,101 | 6/1997 | Tanaka et al. | 277/593 |
| 5,669,614 | 9/1997 | Udagawa | 277/595 |

*Primary Examiner*—James R. Brittain
*Assistant Examiner*—Gary Grafel
*Attorney, Agent, or Firm*—Kanesaka & Takeuchi

[57] ABSTRACT

A metal gasket for an internal combustion engine is formed of a metal plate, and includes a bead formed on the metal plate. The bead has a hardness at least partly different from that of the metal plate by heating the bead locally and then cooling the same. Accordingly, the surface pressure of the bead when the gasket is tightened can be adjusted as desired.

9 Claims, 1 Drawing Sheet

METAL GASKET WITH LOCALLY HEATED-TREATING BEAD

BACKGROUND OF THE INVENTION AND RELATED ART STATEMENT

The present invention relates to a metal gasket with a locally heat-treated bead used for an internal combustion engine.

An internal combustion engine has been developed to provide high power and light weight. As a result, high pressure and high temperature are applied to the engine. Since a metal gasket is strong against high pressure and high temperature, the metal gasket has been widely used.

In the metal gasket, when holes, such as cylinder bores, water holes, oil holes and so on, are sealed, beads are formed on a metal plate around the holes to project outwardly from a metal plate. When the metal plate with the beads is situated between a cylinder block and a cylinder head and is tightened, the beads are compressed to provide surface pressures thereat, by which the holes are sealed.

In the gasket, the various holes are formed as stated above. However, since high pressure and high temperature are formed in the cylinder bores, bolts for tightening the cylinder head and the cylinder block are arranged around the cylinder bores to provide surface pressures around the cylinder bores as equal as possible. The pressures for other holes are less than those of the cylinder bores.

When the gasket is designed, therefore, the highest surface pressures are formed around the cylinder bores to securely seal therearound. In case the beads are formed around the various holes, in view of the required arrangement of the surface pressures on the gasket, the beads around the cylinder bores are formed to provide the surface pressures higher than those of the other holes.

In order to change the surface pressure of the bead, the height and/or width of the bead is changed. Generally speaking, as the height of the bead increases, the surface pressure of the bead increases, and as the width of the bead decreases, the surface pressure of the bead increases. Further, in case the hardness or the thickness of the plate for the bead is changed, the surface pressure of the bead is changed, as well.

The metal gaskets and metal laminate gaskets have been designed and prepared in view of the above, for example, U.S. Pat. No. 5,536,024. However, in case the surface pressures of the beads on one metal plate are changed, the width and/or height of the beads must be changed. In this respect, although the surface pressure of the bead can be adjusted by changing the width and/or height of the bead, the surface pressure can not be precisely adjusted by changing the width and/or height of the bead.

In view of the above, the present invention has been made, and an object of the invention is to provide a metal gasket with a bead, wherein the surface pressure of the bead can be changed easily without changing the width and height.

Another object of the invention is to provide a metal gasket as stated above, wherein the surface pressures of the beads on one metal plate can be changed easily.

A further object of the invention is to provide a metal gasket as stated above, wherein the arrangement of the beads with different surface pressures can be made easily.

Further objects and advantages of the invention will be apparent from the following description of the invention.

SUMMARY OF THE INVENTION

A metal gasket of the invention is used for an internal combustion engine, especially for a cylinder head gasket. The gasket is formed of a metal plate for constituting the metal gasket, and a first bead formed on the metal plate. The first bead has a portion with a hardness different from that of the metal lo plate by a heat treatment, i.e. heating the first bead locally and then cooling the same. The first bead may be heat-treated partly or entirely.

In particular, the metal plate is formed as usual by cutting holes, such as cylinder bores, water holes, oil holes, bolt holes and so on, and forming beads around the required holes, such as cylinder bores, water holes and oil holes. In case the surface pressures of the beads around the cylinder bores have to be increased, the beads, e.g. first beads, are locally heated by laser beam or high frequency waves, and is cooled immediately. As a result, the hardness of the metal plate only at the beads is increased, so that the surface pressures of the beads when the beads are compressed are increased.

The metal plate may further include a second bead, which is not heat-treated. In this case, even if the size of the second bead is the same as that of the first bead, the surface pressure of the second bead becomes weaker than that of the first bead.

Preferably, the first bead is formed around the cylinder bore, and the second bead is formed around a fluid hole, so that the first bead provides the surface pressure greater than that of the second bead when the gasket is tightened.

In order to increase the surface pressure of the bead by the heat treatment, after the bead is heated, the bead is cooled immediately. However, after a bead is heated, the bead may be cooled slowly to provide a weak spring constant. In the invention, the spring constant of a bead can be increased or decreased, as required.

DETAILED DESCRIPTION OF A PREFERRED EMBODIMENT

Figure 1:
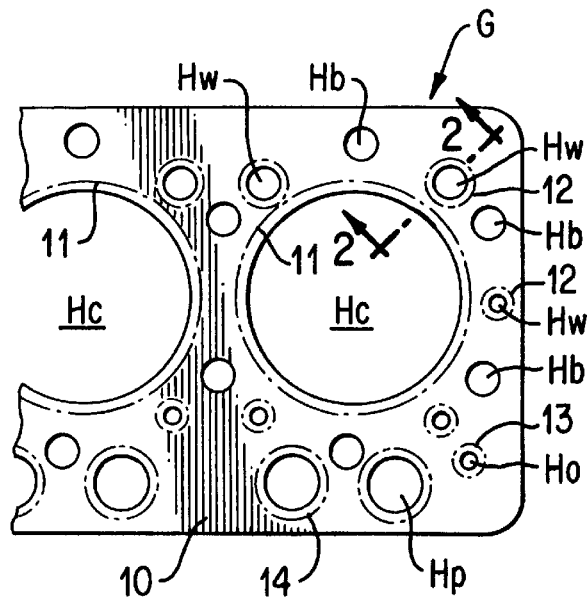
FIG. 1 is a partial plan view of a metal gasket of the present invention.
Figure 2:
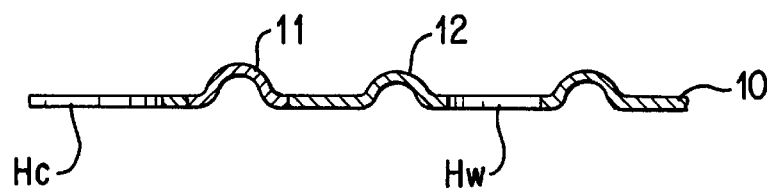
FIG. 2 is an enlarged sectional view taken along line 2—2 in FIG. 1.

With reference to the drawings, an embodiment of the invention is explained. A gasket G is a cylinder head gasket for an internal combustion engine, and includes a plurality of cylinder bores Hc, water holes Hw, oil holes Ho, bolt holes Hb, push rod holes Hp and so on, as in the conventional gasket.

The gasket G is formed of one metal plate 10 extending throughout the entire area to be sealed between a cylinder head and a cylinder block (both not shown). The metal plate 10 includes beads 11 around the cylinder bores Hc, beads 12 around the water holes Hw, beads 13 around the oil holes Ho, and beads 14 around the push rode holes Hp. The beads 12, 13, 14 have the same height, but the bead 11 is higher than the beads 12, 13, 14 to provide high surface pressure when the gasket is tightened.

When the gasket G is formed, the plate 10 is cut along the outer shape of the engine, and also, various holes, i.e. cylinder bores Hc, water holes Hw, oil holes Ho, bolt holes Hb, push rod holes Hp and so on, are formed. Then, the beads 11, 12, 13, 14 are prepared to surround the cylinder bores Hc, water holes Hw, oil holes Ho and push rod holes Hp.

In the invention, after the beads are formed, the beads 11 around the cylinder bores Hc and their vicinities are heated locally by a laser beam, and then cooled immediately. Accordingly, the hardness of the plate 10 at the beads 11 is locally increased. The beads 11 may be locally heated by other means, such as high frequency waves.

As the hardness of the bead 11 is locally increased, the spring constant of the bead 11 is increased as well. In this respect, when a bead with the heat treatment as in the invention is compared with the same size bead without the heat treatment, the bead with the heat treatment can provide surface pressure greater than the bead without heat treatment.

In the invention, the sizes of the beads 11 are greater than those of the other beads 12, 13, 14. However, the beads 11 may have the same sizes as in the other beads. In this case, since the beads 11 have the heat treatment, the beads 11 can provide surface pressures greater than those of the other beads.

Also, in the invention, after the bead 11 is heated, the bead 11 is cooled immediately. However, when the surface pressure of the bead 11 is desired to be slightly lowered, the bead 11 may be cooled gradually to lower the hardness of the plate at the bead.

Further, in the invention, the beads 11 may not be heat-treated, and instead, the other beads 12, 13, 14 may have heat-treatment to lower the hardness of the beads. Namely, after the beads 12, 13, 14 are heated, the beads are gradually cooled to lower the hardness of the beads.

Still further, all the beads formed in the metal plate may be locally heated to increase the hardness of the beads. The heat treatment of the beads may be determined based on the arrangement of the beads, quality of the plate, and so on.

Figure 3:
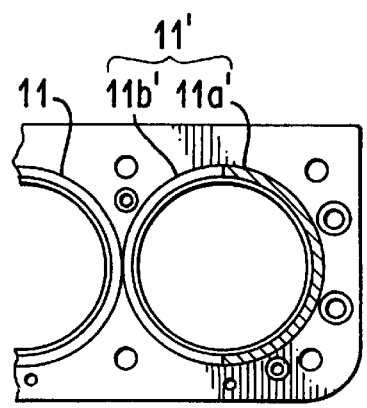
FIG. 3 is a partial plan view of a different embodiment of a metal gasket of the invention.

Still further, as shown in FIG. 3, a part 11a' of a bead 11' may be heat-treated without heat-treating a part 11b'. Namely, one bead 11' has the heat-treated part 11a' and non-heat-treated part 11b'. As a result, only the surface pressure of the part 11a' is increased. The part 11a' may be located at the end portions of the gasket to support high tightening pressure thereat.

In the invention, the gasket G is formed of one metal plate 10. However, the metal plate 10 may be combined with one or more metal plates to constitute a metal laminate gasket.

In the invention, since the desired bead is entirely or partly heat-treated to change the hardness of the bead, it is possible to precisely set the surface pressure of the bead. In view of the tightening pressure of the entire gasket, the arrangement of the surface pressures of the beads can be determined. In the invention, the surface pressure of the bead can be easily adjusted while considering the width and height of the bead.

While the invention has been explained with reference to the specific embodiment of the invention, the explanation is illustrative and the invention is limited only by the appended claims.

What is claimed is:

1. A metal gasket for an internal combustion engine, comprising:
   a metal plate for constituting the metal gasket, said metal plate having a first hardness, and
   a first bead integrally formed with the metal plate and having a portion with a second hardness different from the first hardness of the metal plate by a local heat treatment of the portion of the first bead.

2. A metal gasket according to claim 1, wherein said metal plate further includes a second bead, which is not heat-treated.

3. A metal gasket according to claim 2, wherein said first bead is formed around a cylinder bore, and said second bead is formed around a fluid hole so that the first bead provides surface pressure greater than that of the second bead when the gasket is tightened.

4. A metal gasket according to claim 3, wherein said first bead is locally heated by one of a laser beam and high frequency waves.

5. A metal gasket according to claim 3, wherein said first bead has a height greater than that of the second bead.

6. A metal gasket according to claim 1, wherein said first bead is heat-treated entirely to have the second hardness throughout an entire area thereof.

7. A metal gasket according to claim 1, wherein a half of said first bead is heat-treated to have surface pressure greater than that of the rest of the first bead.

8. A metal gasket for an internal combustion engine, comprising:
   a metal plate for constituting the metal gasket, and
   a first bead integrally formed with the metal plate and having a first portion with a first hardness the same as the hardness of the metal plate, and a second portion with a second hardness different from the first hardness, said second portion receiving a heat treatment to provide the second hardness.

9. A metal gasket according to claim 8, wherein said second portion is harder than the first portion so that the first bead has a partially hard portion.

* * * * *

UNITED STATES PATENT AND TRADEMARK OFFICE
CERTIFICATE OF CORRECTION

PATENT NO.   : 5,906,376
DATED        : May 25, 1999
INVENTOR(S)  : Tsunekazu Udagawa & Susumu Inamura It is certified that error appears in the above-indentified patent and that said Letters Patent is hereby corrected as shown below:

In Cover Page, [54] Title Section, change "METAL GASKET WITH LOCALLY HEATED-TREATING BEAD" to --METAL GASKET WITH LOCALLY HEAT-TREATED BEAD--;

In Column 1, line 1, change "HEATED-" to --HEAT---;
              line 2, change "TREATING" to --TREATED--;
and In Column 2, line 4, delete "lo".

Signed and Sealed this

Twelfth Day of October, 1999

Attest:

Q. TODD DICKINSON

*Attesting Officer*       *Acting Commissioner of Patents and Trademarks*